United States Patent [19]

Jagnow et al.

[11] Patent Number: 4,468,784
[45] Date of Patent: * Aug. 28, 1984

[54] THREE-STATE DIGITAL MIXER-DRIVER CIRCUIT

[75] Inventors: Paul G. Jagnow, Iowa City; David K. Vail, Cedar Rapids, both of Iowa

[73] Assignee: Rockwell International Corporation, El Segundo, Calif.

[*] Notice: The portion of the term of this patent subsequent to May 24, 2000 has been disclaimed.

[21] Appl. No.: 418,494

[22] Filed: Sep. 15, 1982

Related U.S. Application Data

[63] Continuation of Ser. No. 153,226, May 17, 1980, Pat. No. 4,385,401.

[51] Int. Cl.³ .............................................. H04B 1/10
[52] U.S. Cl. ......................................... 375/1; 375/54; 375/94; 455/326; 455/333
[58] Field of Search .................... 375/1, 53, 54, 56, 68, 375/84, 94, 96; 455/323, 326, 330, 333, 303, 306; 332/18, 43, 47, 49; 329/179, 204; 307/239, 240, 241, 242, 244

[56] References Cited

U.S. PATENT DOCUMENTS

| | | | |
|---|---|---|---|
| 3,281,073 | 10/1966 | Chou | 307/239 |
| 3,459,966 | 8/1969 | Brahm | 307/239 |
| 3,924,186 | 12/1975 | Gordy | 375/54 |
| 4,017,798 | 4/1977 | Gordy | 375/94 |
| 4,122,393 | 10/1978 | Gordy | 375/1 |
| 4,163,944 | 8/1979 | Chambers | 375/1 |

*Primary Examiner*—Tommy P. Chin
*Attorney, Agent, or Firm*—Edward A. Gerlaugh; George A. Montanye; H. Fredrick Hamann

[57] ABSTRACT

A mixer-driver circuit in a code correlator of a spread-spectrum communications system simultaneously multiplies an input RF signal with two phase-offset digitally encoded bit streams. A double-balanced mixer is driven with the difference of the digital signals; the mixer is either inverting, noninverting, or off. Matched ECL bistables which reclock the phase-offset bit streams, and a load current steering circuit coupled to the bistables together provide a balanced, differential drive current to the mixer which switches state faster than the bistables alone. In another embodiment, a single bistable receiving an encoded bit stream differentially drives the mixer in a biphase circuit.

14 Claims, 4 Drawing Figures

PRIOR ART

THREE-STATE DIGITAL MIXER-DRIVER CIRCUIT

This is a continuation of U.S. patent application Ser. No. 153,226, filed May 17, 1980 now U.S. Pat. No. 4,385,401.

BACKGROUND OF THE INVENTION

This invention relates generally to radiant energy wave communication, and more particularly, to code modulation, correlation and demodulation in spread-spectrum communication systems.

A spread-spectrum system develops process gain in a sequential-signal bandwidth spreading and despreading operation. The transmit portion of the process may be accomplished with any of the band-spreading modulation methods, as for example, direct sequence modulation wherein the carrier is modulated by a digital code sequence having a bit rate which is much higher than the information signal bandwidth. The receive portion of the process is accomplished by despreading or correlating the received spread-spectrum signal with a locally generated reference signal having the same digital code sequence. When the two coded signals are matched, the desired signal elements, i.e., the data communicated, collapse to their original bandwidth (prior to spreading); and concurrently, any unmatched input is spread by the local reference to its bandwidth or more. A filter then rejects all but the desired narrow-band signal. Thus, given a received signal and its interference (atmospheric noise, receiver noise, and jamming signals), a spread-spectrum receiver enhances the signal while suppressing the effects of all other inputs.

Spread-spectrum signals are demodulated in two steps: first, the spectrum-spreading modulation or digital code sequence is removed; and second, baseband recovery is effected by demodulating the remaining signal which carries information by conventional modulation such as frequency modulation, frequency shift keying or phase shift keying. The present invention finds use in the first of these two steps.

SUMMARY OF THE INVENTION

The present invention utilizes the digital nature of a psuedorandomly encoded spread-spectrum modulating signal to digitally control a double balanced mixer in a three-state mixer-driver. The mixer-driver comprises a pair of bistables each receiving one of two pseudorandom code reference signals which are identical except for a phase offset. The bistables differentially drive one port of a double balanced mixer in accordance with the digital values of the bistables outputs, thus effecting a subtraction of one reference signal from the other concurrently with mixing or multiplying the two signals with an RF signal input to another port of the mixer. A load steering circuit coupled to the one port enhances the switching time of the mixer. In another embodiment, a single bistable is utilized to differentially drive a mixer in a biphase circuit.

BRIEF DESCRIPTION OF THE DRAWING

The invention is pointed out with particularity in the appended claims; however, other objects and features will become more apparent and the invention itself will best be understood by referring to the following description and embodiments taken in conjunction with the accompanying drawing, in which:

DESCRIPTION OF THE PREFERRED EMBODIMENT

Figure 1:
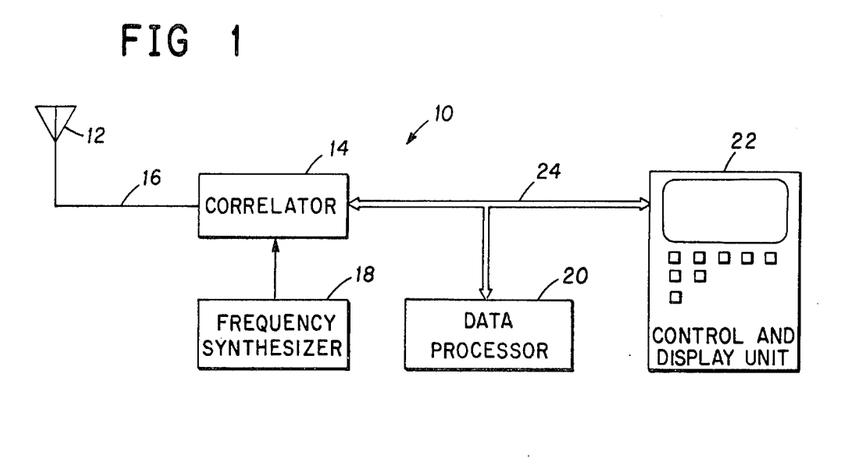
FIG. 1 is a block diagram of a receiver in a spread-spectrum communication system in which the present invention finds use.

Referring now to the various views of the drawing for a detailed description of the operation, construction and other features of the invention by characters of reference, FIG. 1 shows a block diagram of a receiver 10 in a spread-spectrum communications system such as a position location system receiving navigation data from an earth-orbiting satellite. The receiver 10 comprises an antenna 12 coupled to a spread-spectrum correlator 14. A spread-spectrum RF carrier signal, phase modulated by a psuedorandom code bit stream is received via the antenna 12 and coupled to the spread-spectrum correlator 14 via a signal bus 16. A correlator such as the correlator 14 comprises that portion of the receiver in a spread-spectrum system wherein a local code reference signal is compared with the spectrum-spreading code signal modulating the received signal, and the desired signal components are translated into a narrow-bandwidth despread signal, while the signal power of the undesired components of the received signal is concurrently translated or spread over a wide frequency spectrum as determined by the local code reference signal. A frequency synthesizer 18 provides local reference-frequency signals, as well as time-base signals for use in the correlator 14. A system data processor 20 communicates with the correlator 14 and a control and display unit 22 via a bidirectional digital data bus 24. The data processor 20 interprets correlation error signals received from the correlator 14 and generates loop correction signals which are utilized by the correlator 14 to maintain synchronization of the local reference code with the code impressed on the received signal. The correlator 14 further determines the carrier frequency and relative phase shift of the received signal from its transmission to signal reception. The frequency synthesizer 18 provides the required injection frequencies, timing signals and fixed-frequency interrupts for the operations described above. The function of the correlator 14 is thus to accept signals from the antenna 12, process those signals to yield error signals for the carrier and code tracking loops as described hereinafter, and provide data demodulation.

Figure 2:
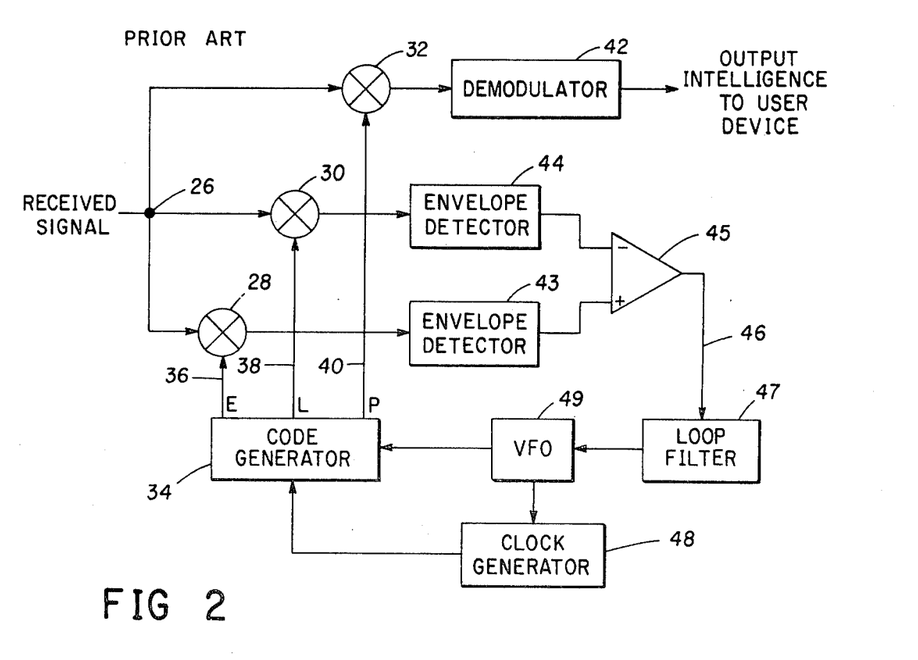
FIG. 2 is a block diagram of a prior-art code correlator.

Referring now to FIG. 2, one type of code tracking commonly employed in spread-spectrum systems is termed delay-lock tracking, wherein three independent IF strips are utilized in the correlator, each mixing a locally generated psuedorandum code signal with the incoming signal and correlating the local code with the received code. FIG. 2 shows a portion of a spread-spectrum receiver wherein the received signal at a junction point 26 is applied to mixers 28, 30, 32 in each of three IF strips. A digital code generator 34 generates three psuedorandomly encoded local reference signals E, L, P, each in the form of a bit stream. A "bit stream" means a sequence of electrical signals or pulses comprising a set of binary digits representing data in coded form wherein the significance of each bit is determined by its position in the sequence and its relation to the other bits.

The E, L and P signals are identical except in relative time displacement as explained hereinafter. The E, L and P signals are coupled via one of three corresponding input conductors or buses 36, 38, 40 to the mixers 28, 30, 32. The code signal coupled to the mixer 32 via the bus 40 is termed a "prompt" code (P), the output of the mixer 28 being an optimally correlated (despread) signal which is coupled to a demodulator 42 for recovery of the desired information contained in the received signal. The other code signals termed "early" (E) and "late" (L) codes are coupled, respectively, via the buses 36, 38, to the mixers 28, 30. The early and late codes are identical to the prompt code except that the late code is delayed in time, as for example, by one code bit time from the prompt code, and the early code occurs prior to the prompt code by an equal amount of time. The early and late codes are each mixed with the incoming signal, respectively, in the mixers 28, 30 and the resultant output signals coupled to envelope detectors 43, 44. The envelope detectors 43, 44 in each channel reflect the degree of code alignment for each, and this information is used in the receiver to implement a tracking loop. The correlated early and late signals, each having a correlation signal amplitude less than maximum because of the phase offset from nominal, are combined in a summing amplifier 45 such that a composite correlation signal at the output thereof on bus 46 has a linear region centered around a point halfway between the correlation maxima of the input signal. The summed correlator outputs are filtered in a loop filter 47 and used to control a clock generator 48 of the receiver, the clock source being a VFO 49. The code generator 34 is responsive to clock signals from the clock generator 48 to generate the prompt code at a point halfway between the maximum and minimum of the summed correlator outputs, thereby causing the receiver to track the incoming code precisely.

An improvement of the delay-lock tracking circuits described above with reference to FIG. 2 reduced the number of the IF channels from three to two by multiplexing the early and late signals through a single IF channel; however, this technique resulted in a noise performance penalty because of the time multiplexing. Another improvement of the classic delay-lock loop implementation is termed an early-minus-late (E-L) approach, wherein the early and late signals are first mixed with the received signal, and the resulting signals are then combined, e.g., in an analog subtractor, prior to being input to the correlator IF strip. Although this technique performed satisfactorily, it was found that the circuit components of the E-L subtractor were difficult to adjust to obtain consistent performance.

The present invention utilizes the digital characteristics of the early and late pseudorandom code signals to drive only one balanced mixer, thus performing the early-minus-late subtraction and code mixing in a single circuit and reducing by one the number of correlator IF strips. Further, the analog E-L subtraction circuit is replaced in the present invention with an adjustment-free digital circuit.

Figure 3:
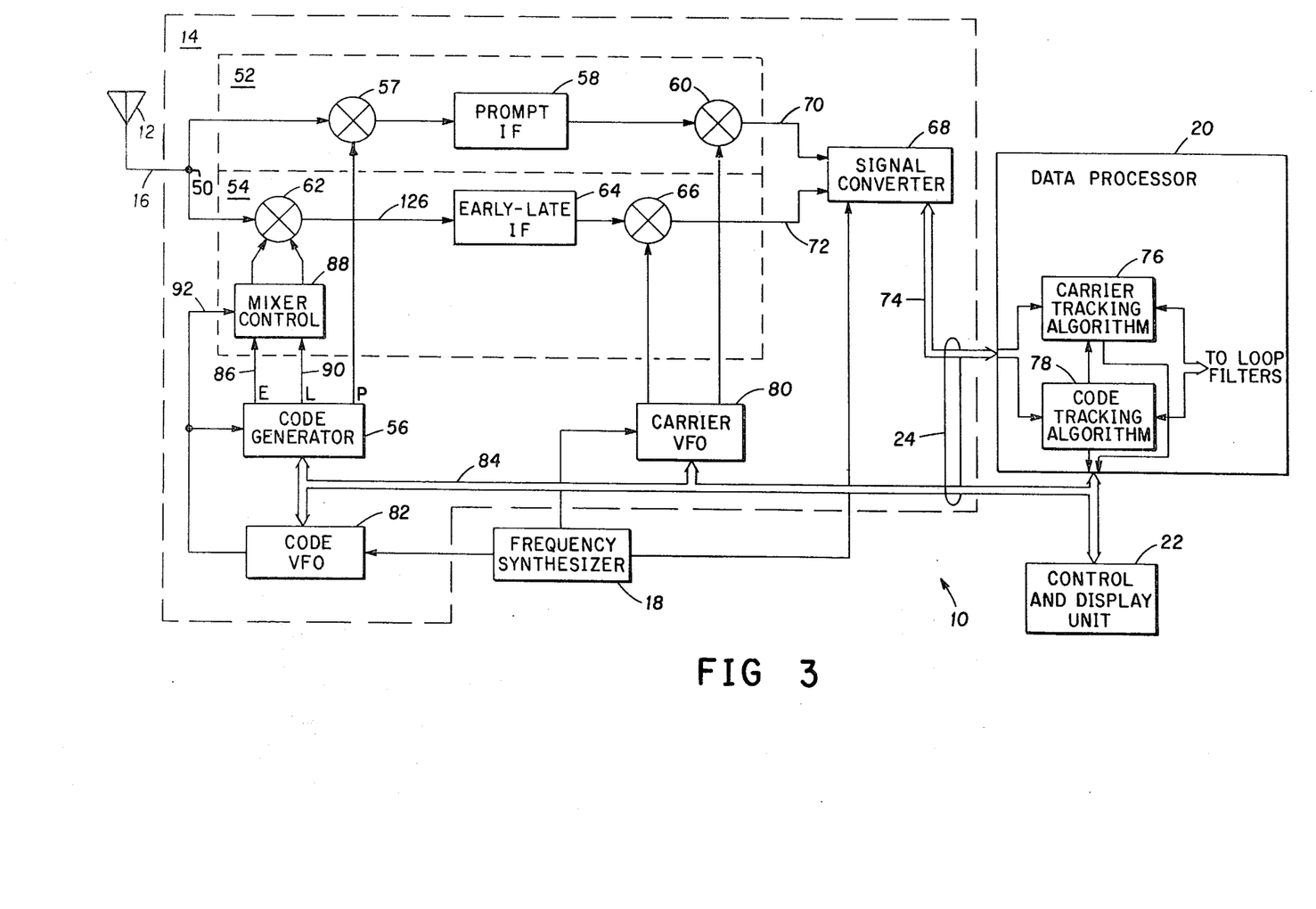
FIG. 3 is a block diagram of the receiver of FIG. 1, showing the correlator in greater detail.

The receiver organization of FIG. 1 is shown in greater detail in FIG. 3. The receiver 10 is representative of one type of receiver in spread-spectrum communication systems utilizing direct-sequence modulation and delay-lock tracking wherein the present invention finds use. FIG. 3 illustrates the manner in which the tracking loops are implemented by closing the loops in software. A description of the detailed structure and all functions and aspects of the receiver operation (including the software which forms no part of the instant invention) is not required for an understanding of the invention. Accordingly, the structure of the receiver and its interface with the software is described herein with detail sufficient only to establish an illustrative environment within which the instant invention functions. Additional detail is available in the literature, e.g., Robert C. Dixon, *Spread Spectrum Systems* (1979, John Wiley & Sons, Inc.).

Referring now to FIG. 3, the correlator 14, receives the incoming signal from the antenna 12; the signal is split at a junction point 50 and processed by two IF strips 52, 54. In the IF strips 52, 54 the local psuedorandom code generator 56 is correlated with the spectrum-spreading code impressed on the received signal. The first IF strip 52 comprises a code mixer 57, a prompt IF channel 58 (which includes down-converters and AGC circuits), and a baseband mixer 60. The second IF strip 54 comprises a code mixer 62, an early-minus-late IF channel 64, and a baseband mixer 66. The early and late codes are both injected into the code mixer 62 and simultaneously combined in accordance with the present invention, thus eliminating an entire IF strip without degrading code tracking performance.

A signal converter 68 of the correlator 14 samples and detects the despread baseband signals coupled thereto via buses 70, 72, performs post-detection integration, and prepares a packet of digital data for periodic transmission via a data bus 74 to the system data processor 20. The converter 68 may be implemented utilizing commercially available integrated-circuit components such as sample-and-hold circuits, analog-to-digital converters, multiplexers, and microprocessor and attendant input/output and storage modules interconnected in a manner known in the art. See for example, C. A. Ogdin, *Microcomputer Design* (1978, Prentice-Hall, Inc.). In the signal converter 68 the despread analog signals on buses 70, 72 are sampled periodically and converted from analog to digital signals, the latter appearing on a signal bus 74 intermediate the converter 68 and the system data processor 20. It should be understood that the term "bus" as used herein means a single conductor or conductor pair, or a plurality of separate conductors arranged to carry a set of signals in parallel comprising, for example, a digital signal representative of a binary number. Within the system data processor 20, the carrier and code tracking algorithms (represented, respectively, by blocks 76 and 78) and the loop filters are executed. Responsive to execution of the carrier and code tracking algorithms 76, 78, the data processor 20 generates digital signals representative of the carrier and code center frequencies of the signal received at the junction point 50 of the correlator 14. A digitally controlled carrier variable frequency oscillator (VFO) 80 and a digitally controlled code VFO 82 receive the respective representative signals via a digital bus 84 from the data processor 20. The carrier VFO 80 generates an injection-frequency signal which is coupled to the baseband mixers 60, 66, serving thereby to remove the carrier frequency component and the nominal doppler-frequency offset of the received signal. The carrier tracking loop thus attempts to adjust the phase and frequency of the carrier VFO 80 to match exactly the frequency of the received signal. The error signal required for the carrier tracking loop is phase error, which may be obtained by using a synchronous detector. The synchronous detector separates the in-phase component (I) of the received signal from the quadrature phase component (Q), and the data processor 20 attempts to adjust the carrier VFO so that the quadrature component Q is zero. The most common type of carrier tracking loop is a Costas loop requiring a correlator wherein the local code input is positioned the same as the received code. The position reference is provided by the code tracking loop. The code VFO 82 is responsive to the digital signals generated in the code tracking loop of the data processor 20 which signals are representative of the code center frequency and are transferred to the code VFO 82 via the digital bus 84, to generate an injection frequency at the basic code rate offset by the nominal doppler frequency shift resulting from the relative movement between the transmitting source and the receiver. The code generator 56, in response to signals coupled thereto via the digital bus 84 from the data processor 20 code tracking loop, generates local psuedorandom codes corresponding to the code utilized in transmitting the spread-spectrum signal. The nominal or prompt code P is multiplied with the incoming signal in the code mixer 57 of the prompt IF strip 52. The early psuedorandom code E, offset by one-half code bit time from the prompt code, is coupled via a bus 86 to a mixer control circuit 88. The late code L, delayed from nominal by an equal amount, i.e., one-half code bit time, is coupled via a bus 90 to the mixer control circuit 88. The mixer control circuit 88 operates under control of a clock signal coupled thereto via a bus 92. The early-minus-late correlation channel 54 operates as though the product of the late psuedorandom code and the input signal where subtracted (in the IF strip) from the product of the early psuedorandom code and input signal. This structure provides a significant performance advantage over E-L subtraction following noncoherent detection.

Low power consumption was of prime importance in the presently described embodiment of the invention; consequently, the code generation circuits such as the code generator 56 were implemented with CMOS LSI technology. This technology cannot provide output signals having the speed and output power required to drive the despreading mixer directly. Further, the delays of the CMOS LSI circuits vary with temperature and operating voltage, and the timing accuracy is therefore inadequate. Accordingly, in the present invention, the code generator 56 simply generates the required pseudorandom bit streams, and a high-speed external clock signal precisely controls the application of the data to the mixer 62 so as to perform proper despreading of the received signal. When the clock signal on the bus 92 changes state from low to high level, the data from the code generator 56 must be applied to the mixer 62 with minimum delay. The mixer control circuit 88 of the present invention performs this function.

Figure 4:
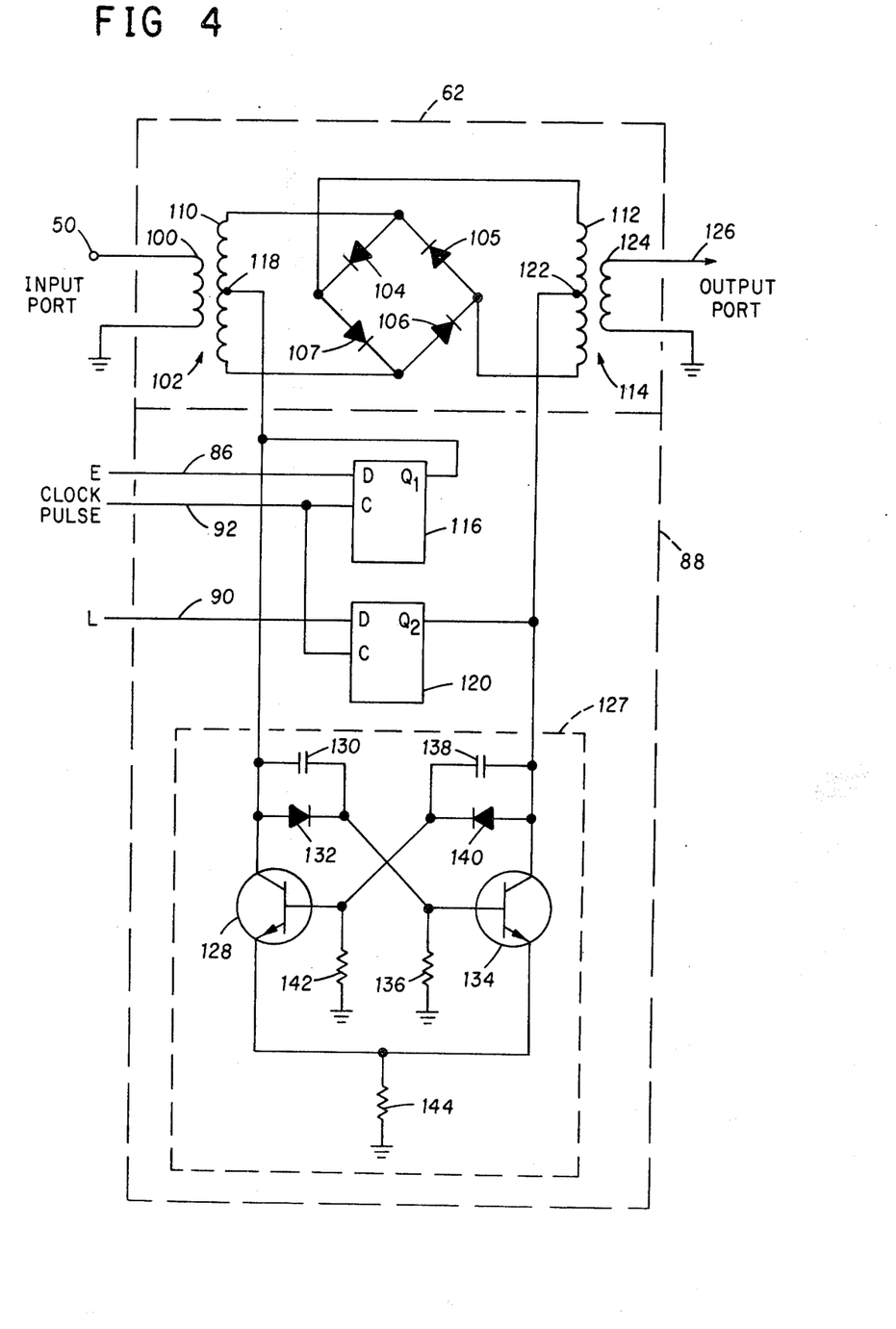
FIG. 4 is a circuit diagram of the present invention.

Referring now to FIG. 4, the E-L code mixer 62 and the mixer control circuit 88 of FIG. 3 are shown in greater detail. The spread-spectrum input signal is connected from the junction point 50 to an input winding 100 of a transformer 102. Four matched, hot-carrier diodes, 104, 105, 106, 107 are connect in ring quad configuration between end terminals of a secondary winding 110 of the transformer 102 and end terminals of a secondary winding 112 of an output transformer 114. The $Q_1$ output of a master-slave D-type bistable 116 is connected to a center tap 118 of the secondary winding 110 of the input transformer 102; the early psuedorandom code signal from the code generator 56 (FIG. 3) is coupled via the bus 86 to the D-input of the bistable 116. The late psuedorandom code signal is coupled via bus 90 from the code generator 56 (FIG. 3) to the D-input of a second bistable 120. The $Q_2$ output of the bistable 120 is connected to a center tap 122 of the output transformer 114 secondary winding 112. The code clock signal generated in the code VFO 82 (FIG. 3) is coupled via the bus 92 to the clock inputs of each of the bistables 116, 120. An output winding 124 of the transformer 114 couples the despread E-L IF signal from the code mixer 62 to the E-L IF channel 64 (FIG. 3) via a bus 126. The code mixer 62 of FIGS. 3 and 4 is a double-balanced mixer and is representative of a prepackaged, commercially available circuit device, for example, the model CM-1P manufactured by the Vari-L Company, Inc. The bistables 116, 120 are a standard ECL integrated circuit component such as an MC10131 dual master-slave flip-flop manufactured by Motorola, Inc.

Referring still to FIG. 4, the mixer control 88 includes a load steering circuit 127. The center tap 118 of the transformer 102 winding 110 is connected to the collector of an NPN transistor 128, to a 470 picofarad capacitor 130, and to the anode of a diode 132. The capacitor 130 and diode 132 are connected in parallel to the base of an NPN transistor 134, and through a 10 kilohm resistor 136 to ground. The center tap 122 of the transformer 114 winding 112 is connected to the collector of the transistor 134, to a 470 picofarad capacitor 138, and to the anode of a diode 140. The capacitor 138 and diode 140 are connected in parallel to the base of the transistor 128, and through a 10 kilohm resistor 142 to ground. The emitters of the transistors 128, 134 are connected together and through a 300 ohm resistor 144 to ground. In the instant embodiment, the transistors 128, 134 are type 2N6304; the diodes type 1N4454.

It is noted that the various electrical signals and pulses generated and utilized in the circuit of the instant invention, as in any circuit or system, will be of some particular magnitude and duration; the values of these signals and pulses, particularly when associated with digital logic elements and where not germane to the understanding or practice of the invention, are described herein merely as logical "1" (high level) or logical "0" (low level); or alternatively, when referring to the output or input signal levels of logic elements, "enabled" or "disabled." The names and conditions of logic elements described herein are set forth generally as defined in the *IFIP-ICC Vocabulary of Information Processing* (1966, NorthHolland Publishing Company, Amsterdam), compiled by the Joint Technical Committee on Terminology, International Federation for Information Processing and International Computation Centre.

The circuit of FIG. 4 is a three-state mixer-driver comprising the high-isolation double balanced mixer 62, the pair of bistables 116, 120, and the load steering circuit 127. The operation of the mixer-driver circuit is analogous with the right-hand side of the identity SE−SL=S(E−L), where S=signal, E=early code, and L=late code, the left-hand side of the identity being analogous with the operation of the prior art circuit utilizing two IF strips and a summing amplifier as previously described herein with reference to FIG. 2 to perform the same function as one IF strip in the presently described embodiment of the invention. The early and late code signals coupled to the bistables 116, 120 are digital bit-streams each having an instantaneous value of either logial "0" or logical "1", therefore, the quantity (E−L) can have only three values; 1, 0, or −1. The early-minus-late subtraction is performed in the circuit of FIG. 4 by driving the dc coupled input port comprising terminals 118, 122 of the balanced mixer 62 differentially, in response to the enabled outputs of the bistables 116, 120, the switching time being augmented by the load steering circuit 127. The mixer 62 could be driven by a single-ended source; however, to obtain accurate demodulation, such a driver would be required to have extremely fast rise and fall times. Any difference between rise time and fall time would appear as an error in the code position. Single-ended drivers approaching such requirements dissipate excessive ambient power, in the order of watts, and do not match the rise and fall time symmetry achieved with the present invention.

Drive current to the mixer in the present invention is supplied by the logical "1" output signal of one of the bistables 116, 120 in the presence of a logical "0" output from the other one of the bistables 116, 120. The logic state present at the D inputs 86, 90 of the bistables 116, 120 at the time of the clock pulse 92 is transferred to the Q output and stored until the next clock pulse occurs. Of the logic circuit families available for use as storage elements, emitter coupled logic (ECL) is the fastest; however, ECL cannot drive a mixer directly, and the rise and fall times of a given output signal are not symmetrical. In the present invention, the ECL outputs are utilized as part of an efficient, fast, symmetrical mixer-driver by adding a differential bipolar steering network such as the load steering circuit 127. Current flows either from the enabled $Q_1$ output driver of the bistable 116 through the mixer 62 diodes 104, 106, through transistor 134 and resistor 144 to ground; or from the enabled $Q_2$ output driver of the bistable 120 through the mixer 62 diodes 105, 107, through transistor 128 and resistor 144 to ground. If the bistables 116, 120 are concurrently in the same state, i.e., both logical "1" or both logical "0", then the input to the mixer 62 is 0 volt and the mixer 62 remains off, i.e., no current flows and the mixer 62 appears as a large RF attenuator to the input signal on the junction point 50.

The switching of the drive current applied to the mixer 62 actually takes place in less time than the transition time of the bistables 116, 120, because the steering transistors 128, 134 selected are extremely fast switching devices, exhibiting turn-on times in the order of 500 picoseconds which is considerably faster than typical ECL transition times of 2 to 3 nanoseconds. As the $Q_1$ and $Q_2$ outputs of the bistables 116, 120 change state, the steering network 127 switches when the ECL output voltages in transition pass each other, thus, the speed of switching is limited only by the speed of the steering transistors 128, 134. The rise and fall times of the bistable 116, 120 outputs do not need to be identical. In the preferred embodiment of the invention the bistables 116, 120 reside on the same monolithic chip and their operating characteristics are thus extremely well matched. Further, because each drive polarity reversal combines the effects of a rising edge and a falling edge, the timing of all such reversals is extremely uniform.

The resistor 144 determines the magnitude of the drive current (in both directions). When the mixer 62 is being driven, the diodes 132, 140 provide a nominal drop of 0.6 volt which results in the emitter voltage of the conducting transistor 128, 134 being lowered by a similar amount. With lowered emitter voltage, the maximum drive voltage to the mixer 62 is approximately 1.0 volt. The diodes 104, 105, 106, 107 conduct with about 0.3 volt drive voltage. The additional 0.7 volt drive voltage acts to overcome any parasitic lead inductance and transformer leakage inductance which would tend to slow the switching time of currents through the mixer 62. The capacitors 130, 138 are bypass capacitors; the resistors 136, 142 provide bias for the diodes 132, 140 and ensure that the transistors 128, 134 will turn off reliably under high temperature, high $I_{CBO}$ conditions.

We have described about an improved three-state mixer-driver circuit utilizing the high-speed ECL storage elements 116, 120 which reclock the digital input signals as the actual driving elements of the circuit; all edges are determined by the input clock. The storage elements 116, 120 are driven directly by the CMOS LSI code generator 56 without intervening logic level conversion; this is due to the relatively high input impedance of the ECL bistables 116, 120. The circuit was described as having utility in a receiver of a spread-spectrum communication system; however, the same circuit may be used in other environments, e.g., in the code modulator of a spread-spectrum transmitter, a test signal generator, etc. With but slight modification, the circuit of the present invention may also be utilized as a precision biphase modulator or demodulator wherein a single bistable logic element such as the bistable 116 of FIG. 4 differentially drives the mixer 62, a disable-signal output driver $\overline{Q}_1$ of the bistable 116 being connected to the center tap 122 instead of the bistable 120.

While the principles of the invention have now been made clear in the foregoing illustrative embodiment, there will be immediately obvious to those skilled in the art many modifications of structure, arrangement, proportions, the elements, materials and components used in the practice of the invention, and otherwise, which are particularly adapted for specific environments and operating requirements without departing from those principles. The apended claims are, therefore, intended to cover and embrace any such modification, within the limits only of the true spirit and scope of the invention.

What is claimed is:

1. RF signal conversion apparatus, comprising:
a signal mixer including input means for receiving a RF signal and output means coupled to the input means for coupling said RF signal mixed to an external user device; and means for controlling circulation of said RF signal traversing the mixer, said circulation controlling means including first means coupled to said mixer for injecting a first binary encoded signal serially into said mixer, the first signal injecting means including first means for driving current through said mixer in a first direction, second means coupled to said mixer for injecting a second binary encoded signal serially into said mixer, the second signal injecting means including second means for driving current through said mixer in a second direction, and means coupled to said mixer and responsive to the first and second current driving means for steering the current in the first and second directions during respective first and second states of said RF signal conversion apparatus, the first current driving means being enabled during the first state of said RF signal conversion apparatus in response to an enabling level of the first binary encoded signal applied to the first signal injecting means concurrently with a disabling level of the second binary encoded signal applied to the second signal injecting means, the second current driving means being enabled during the second state of said RF signal conversion apparatus in response to an enabling level of the second binary encoded signal applied to the second signal injecting means concurrently with a disabling level of the first binary encoded signal applied to the first signal injecting means, the current steering means during a third state of said RF signal conversion apparatus being responsive to enabling levels of the first and second binary encoded signals applied concurrently to the first and second current injecting means and to disabling levels of the first and second binary encoded signals applied concurrently to the first and second current injecting means to disable the first and second current driving means thereby stopping the circulation of current in said mixer during the third state of said RF signal conversion apparatus.

2. The RF signal conversion apparatus as claimed in claim 1 wherein the first and second binary encoded signals have identical codes and are offset in phase from each other.

3. The RF signal conversion apparatus as claimed in claim 1 wherein the input means and the output means each comprise a balanced transmission-line transformer.

4. The RF signal conversion apparatus and claimed in claim 1, wherein said signal mixer comprises a double balanced mixer.

5. The RF signal conversion apparatus as claimed in claims 1, 2, or 3, wherein the first and second signal injecting means each comprises a bistable element responsive to the corresponding one of the first and second binary encoded signals.

6. The RF signal conversion apparatus as claimed in claim 5 wherein the first and second bistable elements have a common clock signal source.

7. The RF signal conversion apparatus as claimed in claims 1, 2, or 3, wherein said mixer includes means connected intermediate said input means and said output means for bidirectionally coupling direct current therebetween.

8. The RF signal conversion apparatus as claimed in claim 7, wherein the first and second injecting means each comprises an ECL bistable element, and the first and second current driving means each comprises an output driver of the corresponding bistable element, the output driver of the first bistable element being connected to said input means and the output driver of the second bistable element being connected to said output means.

9. A three-state mixer-driver circuit, comprising:
a signal mixer including
an input port inductively coupling a RF carrier signal into said mixer,
an output port inductively coupling an output signal of said mixer to an external user device,
means intermediate the input port and the output port for bidirectionally coupling direct current between the input port and the output port, and
a DC-coupled signal injection port having a first terminal connected to the input port and a second terminal connected to the output port; and
means for injecting two bit-streams simultaneously into said DC-coupled signal injection port including
first means for sequentially storing a first bit stream, the first storage means having an output driver connected to the first terminal of the DC-coupled signal injection port,
second means for sequentially storing a second bit stream, the second storage means having an output driver connected to the second terminal of the DC-coupled signal injection port, and
means for steering current, including
first means connected to the second terminal of the DC-coupled signal injection port for conducting the load current of the output driver of the first storage means circulating in a first direction through the bidirectional couling means of said mixer when the first storage means is enabled by the first bit stream and the second storage means is disabled by the second bit stream, and
second means connected to the first terminal of the DC-coupled singal injection port for conducting the load current of the output driver of the second storage means circulating in a direction opposite the first direction through the bidirectional coupling means of said mixer when the second storage means is enabled by the second bit stream and the first storage means is disabled by the first bit stream, the first and second load current conducting means being disabled when the first and second storage means are concurrently enabled by the respective first and second bit streams and when the first and second storage means are concurrently disabled by the respective first and second bit streams.

10. The three-state mixer-driver circuit as claimed in claim 9, wherein the first and second storage means have a common clock signal source.

11. The three-state mixer-driver circuit as claimed in claims 9 or 10, wherein the first and second bit streams have identical binary codes, the bit streams being offset in phase from each other.

12. A three-state mixer-driver circuit comprising:
a first transmission-line transformer having an input winding and a secondary winding, the input winding receiving a RF signal modulated with a pseudorandom code sequence;
a second transmission-line transformer having a secondary winding and an output winding, the output winding being connected to an external user device;
means connected between end terminals of the secondary windings of said first and second transformers for coupling direct current signal in either of two directions therebetween;
a first bistable storage element having an output driver connected to a center terminal of the secondary winding of said first transformer, said first bistable element receiving a first bit stream at an enabling input thereof, the first bit stream being representative of an early pseudorandom code sequence corresponding with the pseudorandum code sequence modulating the RF signal;
a second bistable storage element having an output driver connected to a center terminal of the secondary winding of said second transformer, said second bistable element receiving a second bit stream at an enabling input thereof, the second bit stream being representative of a late pseudorandom code sequence corresponding with the pseudorandom code sequence modulating the RF signal; and
a load current steering circuit including a first transistor connected to the center terminal of the secondary winding of said second transformer and a second transistor connected to the center terminal of the secondary winding of said first transformer, the first transistor conducting when said first bistable is enabled by the first bit stream and said second bistable is disabled by the second bit stream, the second transistor conducting when said second bistable is enabled by the second bit stream and said first bistable is disabled by the first bit stream, the first and second transistors being non-conducting when said first and second bistables are both enabled by the respective first and second bit streams and when said first and second bistables are both disabled by the respective first and second bit streams, said three-state mixer-driver circuit thereby peforming an early-minus-late subtraction of the first and second bit streams.

13. The three-state mixer-driver circuit as claimed in claim 12, wherein the first and second bistable storage elements have a common clock signal source.

14. The three-state mixer-driver circuit as claimed in claim 12 or 13, wherein the first and second bit streams have identical binary codes, the bit streams being offset in phase from each other.

* * * * *

UNITED STATES PATENT OFFICE
CERTIFICATE OF CORRECTION

Patent No. 4,468,784  Dated August 28, 1984

Inventor(s) Paul G. Jagnow and David K. Vail

It is certified that error appears in the above-identified patent and that said Letters Patent are hereby corrected as shown below:

Column 1, line 10, insert --The U.S. Government has rights in this patent under Contract No. F04701-79-C-0083 with the U.S. Air Force.--

Signed and Sealed this

Twenty-second Day of October 1985

[SEAL]

Attest:

Attesting Officer

DONALD J. QUIGG

Commissioner of Patents and
Trademarks—Designate